US012049173B2

(12) United States Patent
Rabouin

(10) Patent No.: US 12,049,173 B2
(45) Date of Patent: Jul. 30, 2024

(54) SUPPORT FOR A CAMERA DISPLAY OF A VEHICLE

(71) Applicant: Volvo Truck Corporation, Gothenburg (SE)

(72) Inventor: Guillaume Rabouin, Ruy Montceau (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/960,319

(22) Filed: Oct. 5, 2022

(65) Prior Publication Data
US 2023/0111473 A1 Apr. 13, 2023

(30) Foreign Application Priority Data

Oct. 8, 2021 (EP) ..................................... 21201780

(51) Int. Cl.
*B60R 11/00* (2006.01)
*B60R 11/02* (2006.01)
(52) U.S. Cl.
CPC ..... *B60R 11/0235* (2013.01); *B60R 2011/0022* (2013.01); *B60R 2011/0085* (2013.01); *B60R 2011/0092* (2013.01)
(58) Field of Classification Search
CPC ......... B60R 11/0235; B60R 2011/0022; B60R 2011/0085; B60R 2011/0092; B60R 1/04; B60R 2011/0021; B60R 11/04; B60R 2300/202; B60R 2300/802; B60R 2300/8066; B60R 2011/0003;
(Continued)

(56) References Cited

U.S. PATENT DOCUMENTS 9,686,876 B2 * 6/2017 Saitou ................. H05K 7/2039
10,252,671 B2 4/2019 Hoenninger
2018/0218611 A1 * 8/2018 Nagura .................... B60Q 9/00
(Continued)

FOREIGN PATENT DOCUMENTS

DE          20010180 U1    8/2000
DE      102019008898 A1    8/2020
(Continued)

OTHER PUBLICATIONS

Extended European Search Report for European Patent Application No. 21201780.0, mailed Mar. 7, 2022, 8 pages.
(Continued)

*Primary Examiner* — Bradley Duckworth
(74) *Attorney, Agent, or Firm* — Withrow & Terranova, PLLC

(57) ABSTRACT

A support for a camera display of a vehicle, the support being configured to be attached to a pillar of a door of the vehicle, the support comprising a bracket configured to be fixedly attached to the pillar, a movable part configured to hold the camera display and to cooperate with the bracket in a movable manner, and an actuator, wherein the actuator is connected to a sensor configured to detect a position of the door between an open position and a closed position, the actuator being configured to move the movable part so that the camera display is in an optimal position when the door is in the closed position and away from the door when the door is in the open position.

6 Claims, 2 Drawing Sheets

(58) Field of Classification Search
CPC ....... B60R 2011/0071; B60R 2011/008; B60R 2011/0082; B60K 2370/77
See application file for complete search history.

(56) References Cited

U.S. PATENT DOCUMENTS

| | | |
|---|---|---|
| 2019/0061622 A1 | 2/2019 | Hoyda et al. |
| 2019/0126847 A1* | 5/2019 | Berne ..................... B60R 1/074 |
| 2020/0108782 A1* | 4/2020 | MacNeille ............. F16M 11/18 |
| 2021/0031691 A1 | 2/2021 | Pulleyblank et al. |
| 2021/0213881 A1* | 7/2021 | Hoyda ................... B60R 1/001 |
| 2023/0145546 A1* | 5/2023 | Hosick ................. B60Q 1/2657 |
| | | 248/925 |

FOREIGN PATENT DOCUMENTS

| | | |
|---|---|---|
| EP | 3444487 A1 | 2/2019 |
| KR | 102011893 B1 | 8/2019 |
| WO | 2013067082 A1 | 5/2013 |
| WO | 2017178859 A1 | 10/2017 |
| WO | 2020098903 A1 | 5/2020 |

OTHER PUBLICATIONS

Intention to Grant for European Patent Application No. 21201780.0, mailed Mar. 28, 2024, 8 pages.

* cited by examiner

SUPPORT FOR A CAMERA DISPLAY OF A VEHICLE

RELATED APPLICATIONS

The present application claims priority to European Patent Application No. 21201780.0, filed on Oct. 8, 2021, and entitled "SUPPORT FOR A CAMERA DISPLAY OF A VEHICLE," which is incorporated herein by reference in its entirety.

TECHNICAL FIELD

The invention relates to a support for a camera display of a vehicle. More precisely, the invention relates to a support for a camera display of a camera monitoring system.

The invention can be applied in heavy-duty vehicles, such as trucks, buses and construction equipment. Although the invention will be described with respect to a heavy-duty vehicle, the invention is not restricted to this particular vehicle, but may also be used in other vehicles such as passenger vehicles.

BACKGROUND

Conventionally, vehicles are equipped with rear-view and side-view mirrors to enable a driver to see rearward or on the sides of the vehicle, for example, to detect obstacles at the left or right side and at the rear of the vehicle. The use of mirrors has however been unsatisfactory and we now meet a trend of replacing conventional mirrors with camera monitoring systems comprising a camera for capturing views of the sides or rear of the vehicle, and a display for displaying the views captured by the camera. These camera monitoring systems are intended to provide at least the functionalities provided by the conventional mirrors.

The display is generally disposed into the vehicle, close to a front door of the vehicle and at the upper interior surface of the windshield of the vehicle. In this manner a driver has a good visibility through the windshield of the vehicle and to the display.

Typically, the display is rigidly affixed around its periphery to a support, such as a bracket member, that is first adhered or otherwise rigidly affixed to the interior surface of the windshield. Because the display is disposed close to the front door of the vehicle, there is a risk that the front door hits the display when the driver slams the door. Thus there is a room for improvement for optimizing the position of the display and to avoid clash and breakage of the display.

SUMMARY

An object of the invention is to provide a support for a camera display of a vehicle, which support is configured to be disposed close to a door of the vehicle, and is movable in order to be in an optimal position when the door is closed and to move away from the door when the door is open.

An "optimal position" is a position optimized to get a wide and clear direct front vision through the windshield and to the camera display. Such an optimal position is as close as possible to the door to get better visibility both for direct visibility trough the windscreen and to the camera display.

The object is achieved by a support.

By the provision of a support which comprises a sensor configured to detect a position of the door between an open position and a closed position, the camera display is automatically moved from an optimal position when the door is in the closed position, and away from the door when the door is in the open position. Therefore, the camera display is automatically moved away from the door in movement in order to avoid any clash/breakage of the display.

According to one embodiment, the actuator is a rotating motor.

According to one embodiment, the actuator is an electric motor.

According to one embodiment, the sensor is a latch sensor.

According to one embodiment, the support further comprises a bracket configured to be attached to the pillar of the door of the vehicle.

According to one embodiment, the movable part is movable in rotation around a vertical axis.

A further object of the invention is a vehicle comprising a support as described above.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
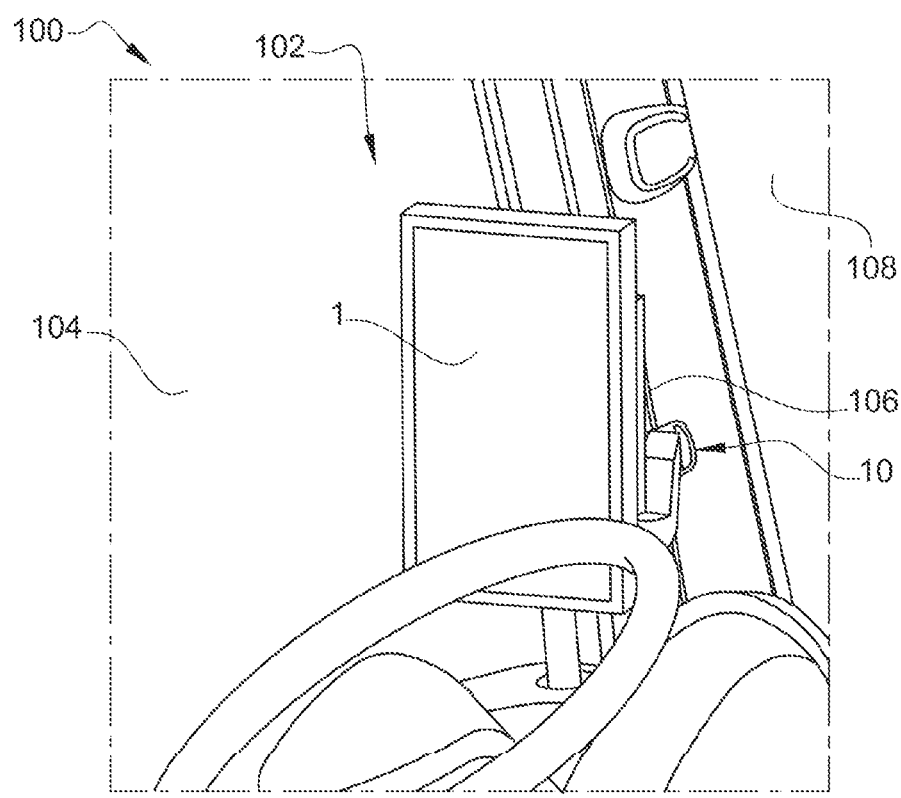
FIG. 1 is a perspective view of a driver's cab of a vehicle, comprising a camera display.
Figure 2:
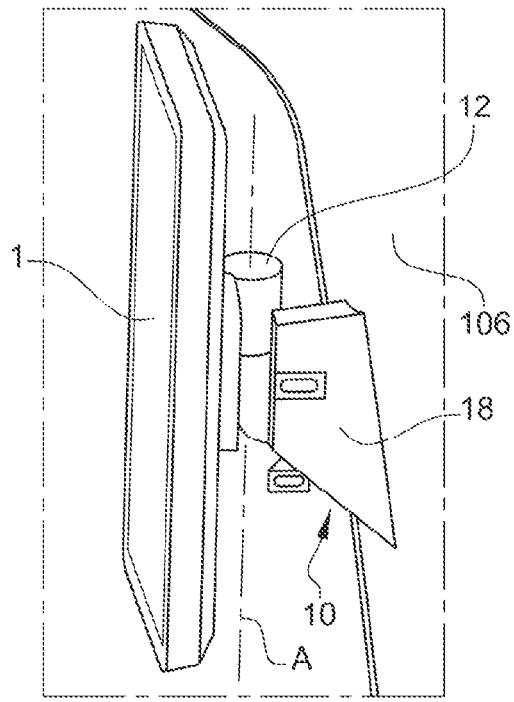
FIG. 2 is a side perspective view of a support according to an embodiment of the invention, disposed on a pillar of a vehicle.
Figure 3:
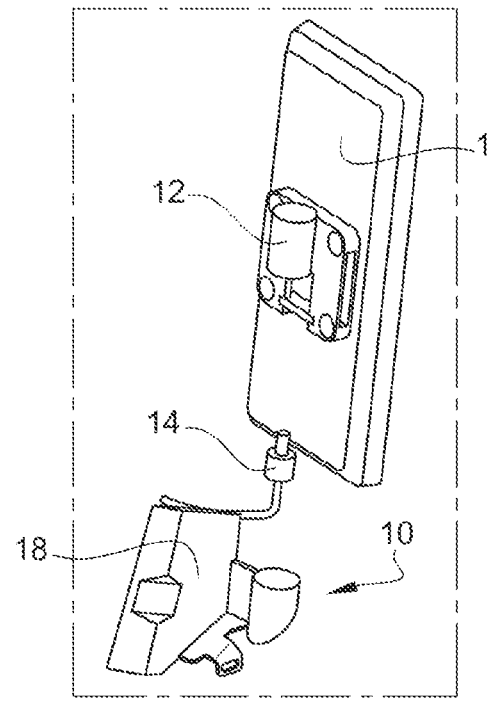
FIG. 3 is an exploded view of the support of FIG. 2.
Figure 4:
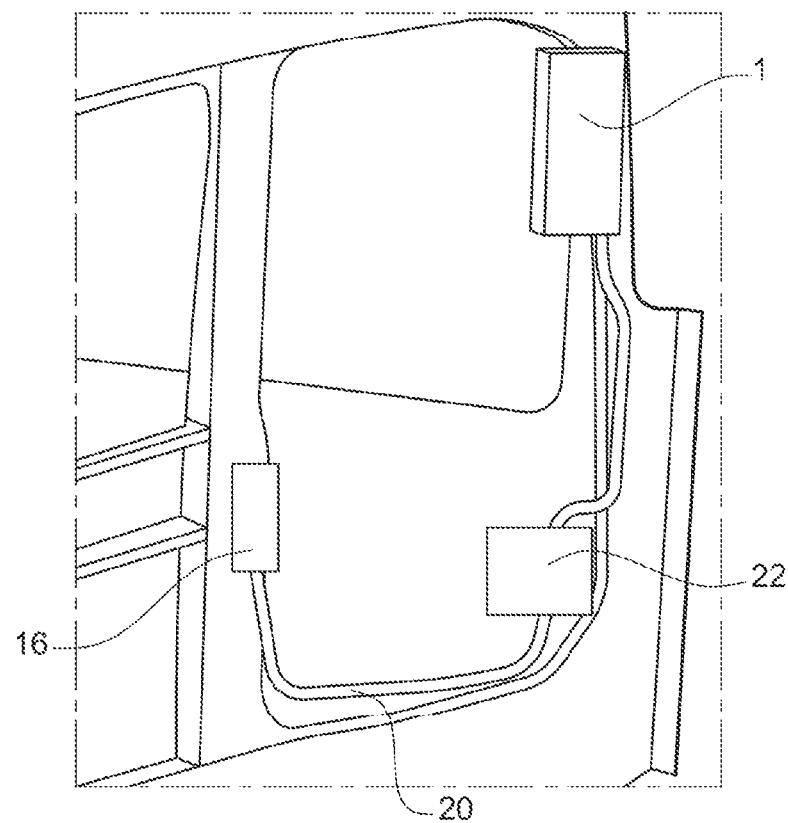
FIG. 4 is a perspective view illustrating a communication between the support of FIG. 2 and a sensor.

FIG. 1 shows a driver's cab 102 of a vehicle 100 comprising a door 104, a pillar 106 and a windshield 108.

The vehicle 100 comprises a camera display 1 configured to communicate with a camera (not represented) of a camera monitoring system in order to enable a driver to see rearward or on the sides of the vehicle 100.

The camera display 1 is disposed on a support 10 attached to the pillar 106 of the vehicle 100.

As shown in FIGS. 1 to 4, the support 10 according to an embodiment of the invention comprises a movable part 12 configured to hold the camera display 1. The support 10 further comprises an actuator 14 configured to move the movable part 12. The actuator 14 is connected to a sensor 16 configured to detect a position of the door 104 between an open position and a closed position.

The actuator 14 is configured to move the movable part 12 so that the camera display 1 is in an optimal position when the door 104 is in the closed position, and away from the door 104 when the door 104 is in the open position. Therefore, the movable part 12 is movable relative to the door 104.

In the optimal position, the camera display 1 is configured to allow a driver to get a wide and clear direct front vision through the windshield 108 and to the camera display 1.

The support 10 can comprise a bracket 18 configured to be fixedly attached to the pillar 106. The bracket 18 can cooperate with the movable part 12 via the actuator 14. Therefore, the movable part 12 can be movable with respect to the bracket 18.

The actuator 14 can be a rotating motor. Therefore, the movable part 12 can be movable in rotation. More precisely, the movable part 12 can be movable in rotation around a vertical axis A with respect to the longitudinal direction of the vehicle 100.

The actuator 14 can be an electric motor.

The sensor 16 can be a latch sensor configured to detect a position of a latch (not represented) of the door 104. The sensor 16 can be electronically connected to the actuator 14 through a wire 20.

The sensor 16 can be configured to be disposed close to the latch.

The support 10 can further comprise an electronic control unit (ECU) 22 configured to receive a signal from the sensor 16 and to control the actuator 14 according to the signal.

Figure 5:
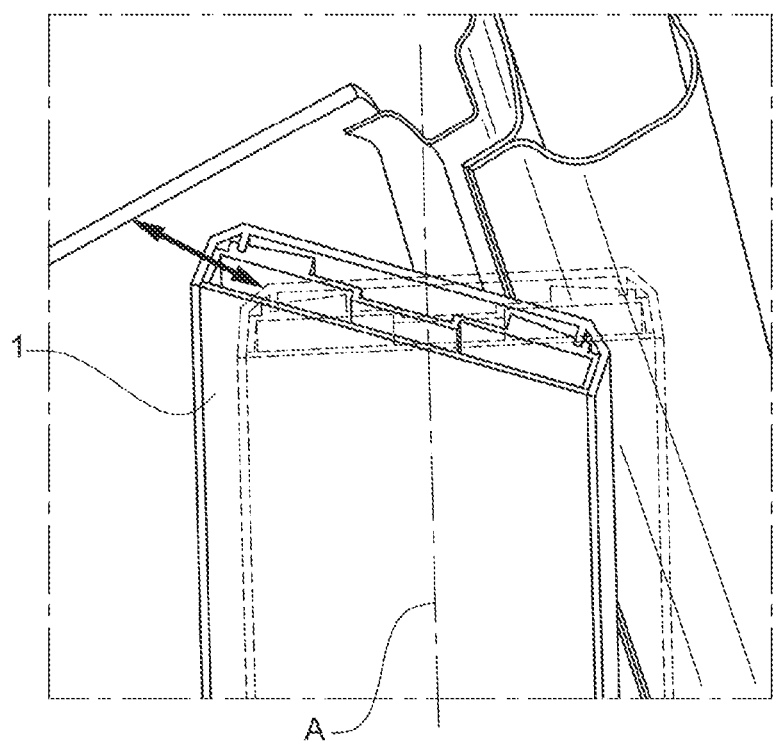
FIG. 5 is a partial perspective view of a camera display disposed on the support of FIG. 2, illustrating the functioning of the support.

As illustrated in FIG. 5, the movable part 12 is configured to move the camera display 1.

The movable part 12 can be configured to move the camera display 1 in rotation around the vertical axis A.

When the door 104 is in the closed position, the movable part 12 is in a position so that the camera display 1 is in the optimal position as illustrated in solid lines in FIG. 5. When the door 104 is in the open position, the movable part 12 rotates so that the camera display 1 is moved away from the door 104 as illustrated in dashed lines in FIG. 5.

It is to be understood that the present invention is not limited to the embodiments described above and illustrated in the drawings; rather, the skilled person will recognize that many changes and modifications may be made within the scope of the appended claims.

The invention claimed is:

1. A support for a camera display of a vehicle, the support being configured to be attached to a pillar of a door of the vehicle, the support comprising:
   a bracket configured to be fixedly attached to the pillar,
   a movable part configured to hold the camera display and to cooperate with the bracket in a movable manner, the movable part being configured to extend into an interior of the vehicle, and
   an actuator,
   wherein the actuator is functionally connected to a sensor, the sensor configured to detect a position of the door between an open position and a closed position, and
   based on an input from the sensor, the actuator being configured to move the movable part so that the camera display is in an optimal position when the door is in the closed position and away from the door when the door is in the open position.

2. The support of claim 1, wherein the actuator is a rotating motor.

3. The support of claim 1, wherein the actuator is an electric motor.

4. The support of claim 1, wherein the sensor is a latch sensor.

5. The support of claim 1, wherein the movable part is movable in rotation around a vertical axis.

6. A vehicle comprising the support of claim 1.

* * * * *